Oct. 30, 1945.  W. H. LEHMBERG ET AL  2,387,849
EYE PROTECTION MEANS AND SUPPORTING MEANS THEREOF
Filed Aug. 30, 1943  2 Sheets-Sheet 1
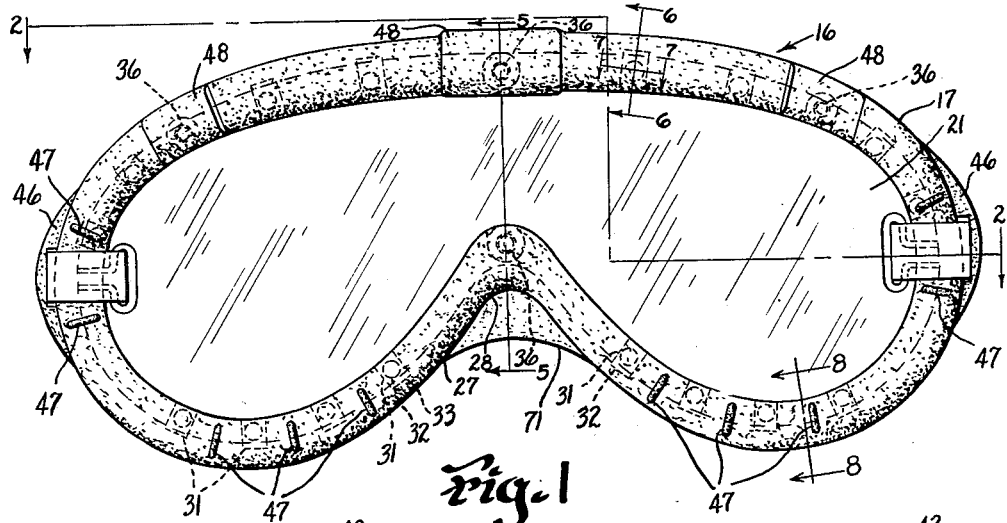
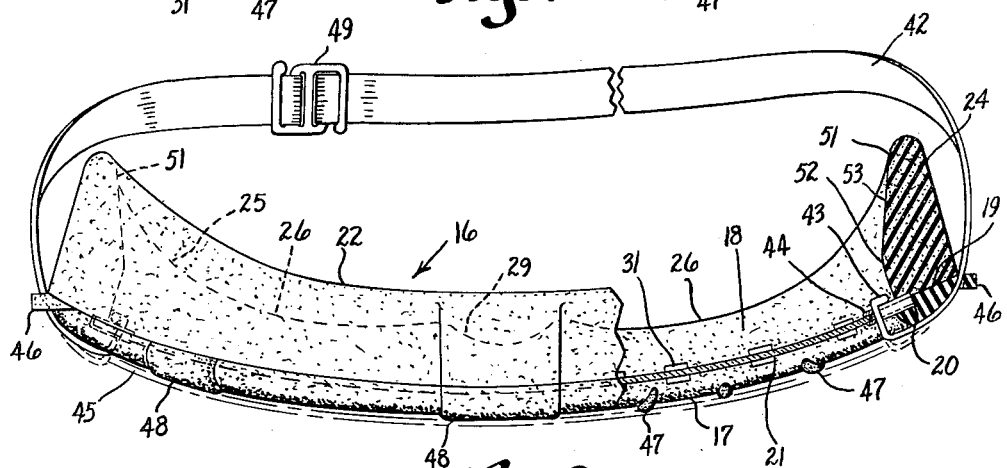
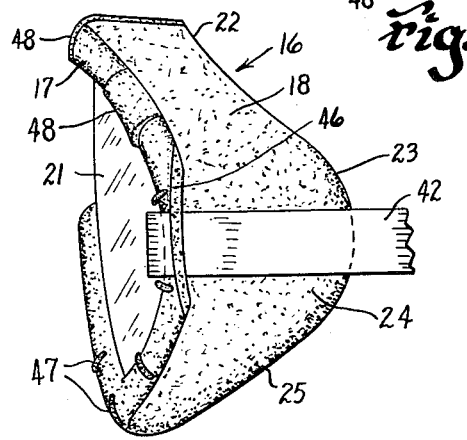
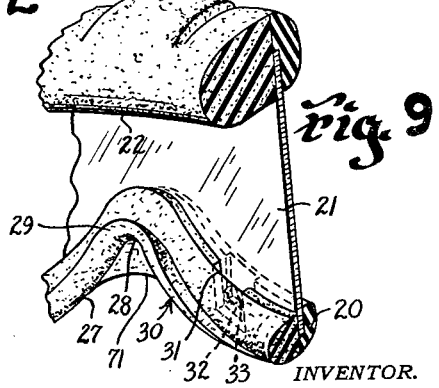
INVENTOR.
WILLIAM H. LEHMBERG
CHARLES A. BARATELLI
WALTER LOWN
BY Louis L. Gagnon ATTORNEY.

Oct. 30, 1945.  W. H. LEHMBERG ET AL  2,387,849
EYE PROTECTION MEANS AND SUPPORTING MEANS THEREOF
Filed Aug. 30, 1943  2 Sheets-Sheet 2
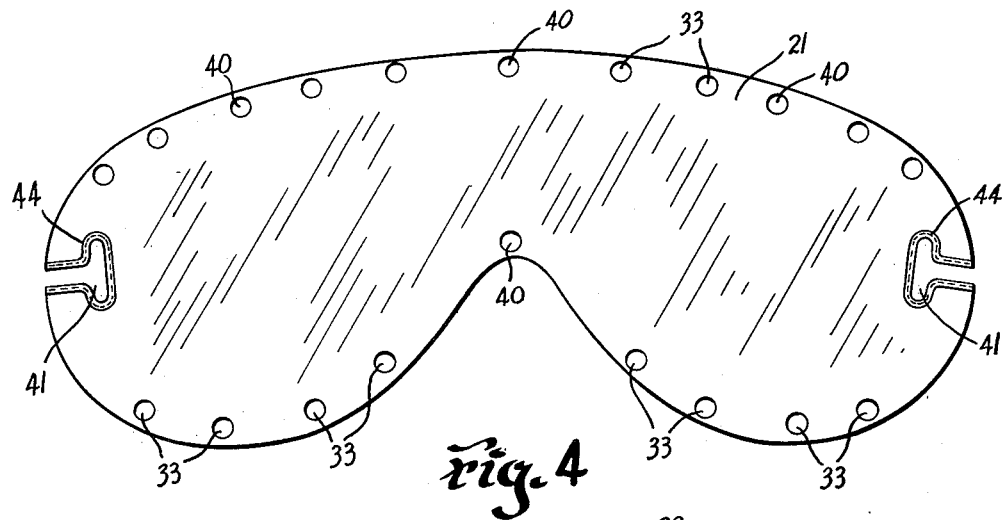
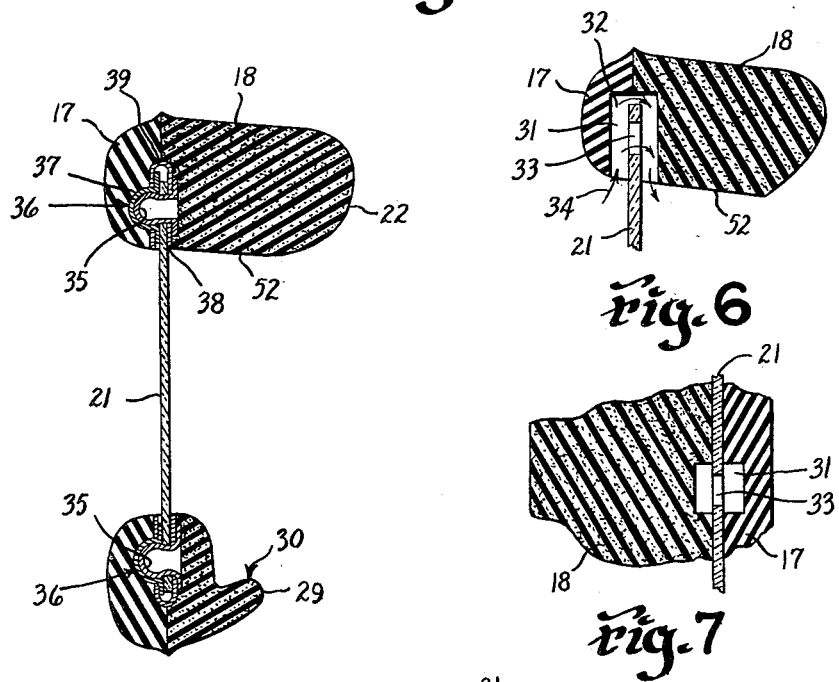
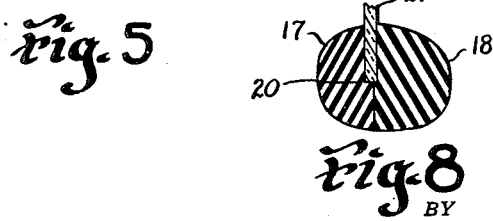
INVENTOR.
WILLIAM H. LEHMBERG
CHARLES A. BARATELLI
WALTER LOWN
BY Louis R. Gagnon ATTORNEY.

Patented Oct. 30, 1945

2,387,849

UNITED STATES PATENT OFFICE 2,387,849

EYE PROTECTION MEANS AND SUPPORTING MEANS THEREOF

William H. Lehmberg, Riverside, Conn., and Charles A. Baratelli, Cambridge, and Walter Lown, Boston, Mass., assignors to American Optical Company, Southbridge, Mass., a voluntary association of Massachusetts Application August 30, 1943, Serial No. 500,570

6 Claims. (Cl. 2—14)

This invention relates to improvements in eye protection means, and particularly to the supporting means thereof. The application is a division of application Ser. No. 469,020, filed December 14, 1942 in which we are named as joint inventors, together with D. P. Bernheim, Walter Lown and E. M. Splaine.

It has been usual, in the past, to provide eye protection goggles for specific and restrictive uses, depending upon the particular hazards encountered.

Such practice, therefore, resulted in a number of different eye protection devices which were only suitable for certain specific uses. This was due primarily to the fact that while a particular eye protection device or goggle met the requirements of some uses, it would be entirely impractical or inadequate for other specific uses.

In the aforesaid application Ser. No. 469,020 there is shown and described an eye protection device or goggle having novel features embodied therein for rendering said goggle adaptable for general utility, thereby obviating the necessity of having a plurality of different type goggles. These features include novel headband attaching means by which a headband may be attached to the lens and to the frame of the goggle in a manner to support the goggle properly upon the head and against the face, while permitting ready removability of lenses from the frame and the replacement of lenses therein.

These novel headband attaching means are our invention which forms the subject matter of this application, although the invention is shown and described herein in conjunction with other features of the goggle shown and described in said prior application, Ser. No. 469,020, with which said means are particularly designed to co-operate.

In the accompanying drawings:

Fig. 1 is a front view of an eye protection device embodying the invention;

Fig. 2 is a plan view, partially in section, of the device illustrated in Fig. 1;

Fig. 3 is a side elevational view of said device;

Fig. 4 is a front view of the lens;

Fig. 5 is an enlarged sectional view taken as on line 5—5 of Fig. 1;

Fig. 6 is an enlarged fragmentary sectional view taken as on line 6—6 of Fig. 1;

Fig. 7 is an enlarged fragmentary sectional view taken as on line 7—7 of Fig. 1 and in a direction substantially normal to direction 6—6;

Fig. 8 is an enlarged fragmentary sectional view taken as on line 8—8 of Fig. 1; and Fig. 9 is a fragmentary perspective view, partially in section, showing the rear of the nose-engaging portion.

Referring now to the drawings wherein like characters of reference designate like parts throughout the several views, the goggles shown comprise a face piece 16 including a frame-like portion 17 of resilient material such as rubber, latex, rubber latex, vinyl chlorid, ethyl cellulose plasticized with castor oil or other suitable plasticizer, or other known synthetic rubbers, or other means having similar characteristics. The frame-like member 17 is formed of relatively hard material of the above nature and has secured thereto, by vulcanizing or other suitable means, a face engaging portion 18 formed of any one or more of the various materials set forth above but which has the characteristics of sponge rubber thereby being more resilient than the frame-like portion 17. The portion 18 is secured to the frame-like portion 17, as illustrated at 19, by vulcanizing or by the use of suitable cements, such as latex cement or cements having similar characteristics.

The portion 17 is formed with an internal shouldered edge 20 which, when said portion 17 is secured to the portion 18, provides a continuous slot or groove throughout the frame-like portion 17 for receiving the edge of the lens 21. The lens 21 may be formed of any suitable transparent material and is preferably formed of any one of several known transparent artificial resins, such as methyl methacrylate or may be formed of glass, Celluloid, or the like. The lens 21 is placed within the lens retaining groove or slot by distorting the material of the frame-like portion 17 and face engaging portion 18 and by allowing the said material to return to its initial set after the lens has been placed within the slot or groove. The face engaging portion 18 has an upper contour edge 22 shaped to the general contour characteristics of the forehead adjacent the brow. The edge 22 curves outwardly and rearwardly and blends with the contour edge 23 of the side portions 24 of the facepiece. The edge 23 is shaped to fit the general contour of the temporal sides of the face adjacent the outer orbital brims of the eyes. The face engaging edge continues downwardly and inwardly, as illustrated at 25 in Fig. 3, and at 25 in Fig. 2, and blends with the lower contour edges 26 of the facepiece which are shaped to fit the general contour shape of the cheekbones below the eyes.

The facepiece 18, as illustrated at 27 in Figs. 1 and 9, is shaped to provide a nasal recess 28 with the face engaging portion 18 having a face engaging edge 29, at said location, shaped to fit the general contour characteristics of the bridge of the nose. The portion having the contour edge 29 is in the form of a relatively thin rearwardly extending integral lip 30, see Fig. 9. It is to be noted that the lip 30, as shown in Fig. 2, has a forwardly extending curved portion along the edge 29 as well as downwardly extending side portions, as shown in Fig. 9, to inherently fit the general contour characteristics of the nose and extends downwardly at the sides and tapers inwardly to blend with the adjacent portion of the face engaging member 18. This is to insure greater resiliency at said location and to provide a more intimate fit with the nose without undue pressure thereon. In order to insure a more intimate seal adjacent the nose the facepiece is provided with a relatively thin integral web 71 of relatively soft resilient material simulating the material of the portion 18. The complete face engaging portion of the member 18, therefore, is initially shaped to fit the general facial characteristics of most individuals throughout the contour of the eyes.

The lens receiving slot or groove resulting from the shouldered portion 20 is provided, at spaced intervals, with a plurality of recesses 31, illustrated by the dash lines in Fig. 1, and shown in perspective in Fig. 9 and in cross-section in Figs. 6 and 7. As shown in Figs. 6, 7 and 9, the recesses 31 are considerably wider than the width of the slot for receiving the lens and extend below or above the base of the lens receiving slot as illustrated at 32. This provides a clearance between the base of each recess 31 and the adjacent edge of the lens whereby air entering the recess 31 from the front of the lens may pass through the space 32 inwardly of the facepiece 18 to the rear side of the lens. To insure more positive ventilation, the lens 21 is provided with openings 33 spaced a distance apart substantially equal to the distance between the corresponding recesses.

Air entering the recesses 31, as indicated by the plurality of arrows 34 in Fig. 6, will pass about the edge of the lens through the space 32 and will also pass through the openings 33 in the lens.

There are additional openings in the lens simulating the openings 33 which are adapted to fit over the male portions 35 of suitable snap fasteners or the like 36, see Figs. 1 and 5. The male portions 35 are secured to and carried by the facepiece 18. Each snap fastener also has a female portion 37 carried by the frame-like member 17. Each of said male and female portions are carried by a web 38 which assists in retaining the said male and female portions in proper aligned relation with each other and also aid in attaching the said portions to the facepiece. The attachment may be through the use of suitable latex, cement or other suitable means. It is to be noted that the web 18 forms a hinge-like portion 39 which, when the female member is snapped free from the male member 35, permits the lower edge of the groove portion of the frame-like member 17 along with said female portion to be twisted in an outward direction to permit the portion of the lens 21 having the connection opening therein to be fitted over the male member and the lens to be secured inwardly of the lens retaining slot or groove at the location of each of the respective snap fasteners 36. The openings which are preferably used as attachment openings are illustrated at 40 respectively in Fig. 4.

The novel headband attachment means of the present invention includes T-shaped slots 41 provided in the lens 21 on the opposed sides thereof. The slots are preferably formed T-shaped in order to afford ease in attaching the headband 42 thereto. The headband 42 has enlarged portions 43 adjacent the ends thereof attached to the T-slots and the ends are located in the T-slot by threading the same inwardly of the T-shaped slot from the open side thereof.

In order to reinforce the T-shaped slotted portions the edges of said slotted portions are provided with a metal binding or an integral bead or the like 44.

In order to retain the ends 43 in proper fitted relation in the T-shaped slots 41 and to aid in preventing the facepiece 16 of the goggle from rotating or tilting forwardly or rearwardly when suspended by the headband the face-piece is provided, on the temporal sides thereof, with slotted integral portions 46 through which the headband 42 is threaded.

This causes the facepiece to be of greater gravital weight below a horizontal suspension line extending through the integral slotted portions 46 thereby preventing the said facepiece from tilting forwardly and rearwardly relative to the headband when suspended by said headband. The slotted portions 46, as shown in Fig. 2, also aid in retaining a cover glass or the like 45, as illustrated by the dot and dash lines, in relatively intimate relation with the front of the facepiece. This is because of the fact that the slotted ends of the cover glass are retained between the anchored ends 43 and the portions threaded through the slots 46.

The member 45, although termed a cover glass, is preferably formed essentially of the same material as the main lens portion 21 and is provided with slots adjacent the opposed sides thereof through which the headband 42 is threaded in a manner simulating the connection of said headband with the main lens 21. The cover glass may be an auxiliary protection lens used jointly with the lens 21, which may be of a different color or of different light absorptive characteristics than the main lens portion as to infra-red or ultra-violet rays or may be formed of material possessing light-polarizing characteristics. Such polarizing material may be any of the light-polarizing materials sold under the trade name "Polaroid."

The framing 17 is provided with a plurality of integral lugs or spacer members 47 and 48 on the face thereof to provide ventilation between the cover glass and said framing.

Having illustrated and described a preferred embodiment of our invention, what we desire to claim and secure by Letters Patent is:

1. Goggles comprising a single aperture goggles frame, a readily removable flexible lens secured within said frame, fastening straps having thickened terminals, and apertured fastening strap temple wings on said frame, said lens having strap terminal receiving T-slots at its temple ends.

2. Goggles comprising a single aperture goggles frame of flexible and resilient material adapted to fit about the eyes of the wearer, a single lens for said aperture, a groove in said frame to receive the peripheral edge of the lens, fastener means carried by the frame extending into said groove and releasably engaging the lens, and a head band having its ends threaded through passages in the ends of the frame and detachably connected to the ends of the lens, whereby said lens is retained in said frame and securely held in place there when the goggles are in use, while the lens may be readily removed from the frame by releasing said fastener means, deforming the groove-containing portion of the frame, and disconnecting the ends of the head band from the lens.

3. Goggles comprising a single aperture frame of flexible and resilient material adapted to fit about the eyes of the wearer, a single lens for said aperture, said frame having a seat for the peripheral edge of the lens, fastener means for releasably securing the lens to said seat, and a head band having its ends threaded through passages in the ends of the frame and detachably connected to the ends of the lens, whereby said lens is securely held in place against its seat when the goggles are in use, while the lens may be readily removed from the frame upon releasing said fastener means and disconnecting the ends of the head band from the lens.

4. Goggles comprising a single aperture flexible goggles frame, a readily removable flexible lens secured within said frame, fastening straps having trickened terminals, and apertured fastening strap temple wings on said frame, said lens having strap terminal receiving means at its temple ends.

5. Goggles comprising a single aperture goggles frame of flexible and resilient material adapted to fit around the eyes of the wearer, a single lens for said aperture, a groove in said frame to receive the peripheral edge of the lens, fastener means carried by the frame extending into said groove and releasably engaging the lens, and a head band detachably connected to the ends of the lens with the end portions of the head band extending forwardly from the lens and around the front of the frame and then rearwardly, whereby said lens is retained in said frame and securely held in place there when the goggles are in use, while the lens may be readily removed from the frame by releasing said fastener means, deforming the groove-containing portion of the frame, and disconnecting the ends of the head band from the lens.

6. Goggles comprising a single aperture goggles frame, a readily removable flexible lens, detachable fastener means for securing said lens to said frame, and fastening straps having thickened terminals, said lens having strap terminal receiving slots at its temple ends, whereby upon removal of the lens from the frame the straps may be readily disengaged from the lens.

WILLIAM H. LEHMBERG.
CHARLES A. BARATELLI.
WALTER LOWN.